United States Patent
Chang

(10) Patent No.: US 8,824,497 B2
(45) Date of Patent: Sep. 2, 2014

(54) METHOD AND APPARATUS FOR PERFORMING DATA ACCESS ACCORDING TO PROTOCOL HANDLING

(75) Inventor: Chiung Hung Chang, Hsinchu Hsien (TW)

(73) Assignee: MStar Semiconductor, Inc. (TW)

( * ) Notice: Subject to any disclaimer, the term of this patent is extended or adjusted under 35 U.S.C. 154(b) by 784 days.

(21) Appl. No.: 12/730,711

(22) Filed: Mar. 24, 2010

(65) Prior Publication Data

US 2010/0246428 A1   Sep. 30, 2010

(30) Foreign Application Priority Data

Mar. 30, 2009   (TW) ................ 98110534 A

(51) Int. Cl.
| | | |
|---|---|---|
| H04L 12/43 | (2006.01) |
| G06K 7/00 | (2006.01) |
| G06F 1/32 | (2006.01) |
| H04B 5/00 | (2006.01) |
| G06K 7/10 | (2006.01) |

(52) U.S. Cl.
CPC ........... *G06K 7/0008* (2013.01); *Y02B 60/1217* (2013.01); *G06F 1/324* (2013.01); *G06F 1/3228* (2013.01); *H04B 5/0031* (2013.01); *G06K 7/10059* (2013.01)
USPC ......................................... 370/458

(58) Field of Classification Search
None
See application file for complete search history.

(56) References Cited

U.S. PATENT DOCUMENTS

| | | | | |
|---|---|---|---|---|
| 6,021,137 A * | 2/2000 | Kato et al. | .................... | 370/479 |
| 6,209,119 B1 * | 3/2001 | Fukui | ........................... | 716/104 |
| 2004/0193935 A1 * | 9/2004 | Kato et al. | .................... | 713/500 |
| 2005/0077356 A1 * | 4/2005 | Takayama et al. | ............ | 235/451 |
| 2005/0229179 A1 * | 10/2005 | Ballantyne | .................... | 718/100 |
| 2006/0285554 A1 * | 12/2006 | Schaller | ........................ | 370/470 |
| 2007/0126555 A1 * | 6/2007 | Bandy | .......................... | 340/10.2 |
| 2008/0025224 A1 * | 1/2008 | Eguchi | ......................... | 370/241 |
| 2008/0059828 A1 * | 3/2008 | Siggelkow et al. | ........... | 713/501 |
| 2008/0066072 A1 * | 3/2008 | Yurekli et al. | ................ | 718/104 |
| 2008/0069045 A1 * | 3/2008 | Delamotte et al. | ............ | 370/330 |
| 2010/0141392 A1 * | 6/2010 | Jo et al. | ........................ | 340/10.2 |

FOREIGN PATENT DOCUMENTS

| | | |
|---|---|---|
| CN | 101051356 A | 10/2007 |
| CN | 101295344 A | 10/2008 |

OTHER PUBLICATIONS

First Examination Opinion issued by State Intellectual Property Office of China on Sep. 8, 2011 regarding Chinese Patent Application No. 200910131159.6 (Document Serial No. 2011090500578940).

* cited by examiner

*Primary Examiner* — Chirag Shah
*Assistant Examiner* — Amar Persaud
(74) *Attorney, Agent, or Firm* — Han IP Corporation

(57) ABSTRACT

A method for performing data access via software according to communication protocol handling includes: calculating a time slot period and an upper limit of a processing time for performing a predetermined data processing according to time slot information defined in a communication protocol, a critical period and a time slot number; defining a clock frequency of a processor according to the upper limit of the processing time; and performing data access according to the slot time by the processor operating at the clock frequency. Accordingly, design inflexibility arising from performing data access via hardware is addressed, and a non-real-time issue caused by performing data access via software is also prevented.

20 Claims, 5 Drawing Sheets

US 8,824,497 B2

METHOD AND APPARATUS FOR PERFORMING DATA ACCESS ACCORDING TO PROTOCOL HANDLING

CROSS REFERENCE TO RELATED PATENT APPLICATIONS

This patent application claims priority from Taiwan Patent Application No. 098110534, filed in the Taiwan Patent Office on Mar. 30, 2009, entitled "Method and Apparatus for Performing Data Access According to Protocol Handling", and incorporates the Taiwan patent application in its entirety by reference.

TECHNICAL FIELD

The present disclosure relates to a data access mechanism, and more particularly, to a method and an apparatus for performing data access via software according to communication protocol handling.

BACKGROUND OF THE DISCLOSURE

In applications of the radio frequency identification (RFID) technology, an approach of detecting certain apparatuses via a time slot detection is quite common. For example, an RFID system comprises an RFID reader and a plurality of RFID tags each comprising a unique identification code (UID code). The RFID reader accesses the UID code of each of the plurality of RFID tags according to an RFID communication protocol to identify the respective RFID tag. When a plurality of RFID tags, e.g., five RFID tags 1 to 5, become close to an inductor of a door control system, the inductor generates a plurality of time slots, e.g., three time slots comprising namely a first time slot, a second time slot and a third time slot, simultaneously informs the five RFID tags of the time slot number of three, and requests the five RFID tags to reply to the inductor during the time slots. Accordingly, the RIFD tags generate random codes via electric energy induced by the inductor, calculate the number of the time slots, and reply to the inductor during the time slots corresponding to the random codes. When only one RFID tag replies to the inductor during one time slot, the inductor successfully identifies the RFID tag and requests the RFID tag to transmit a reply report comprising the UID code of the RFID tag. When the number of the time slots is smaller than that of the RFID tags, a collision occurs when a plurality of RFID tags reply to the same RFID reader, i.e., when two or more RFID tags simultaneously reply to the RFID reader during a single time slot. At this time, the plurality of RFID tags replying to the RFID reader during the time slot keep replying during the time slot in a next stage until all RFID tags are identified by the RFID reader.

Continuing with the foregoing example, suppose the five RFID tags reply to the inductor according to the random codes, i.e., the RFID tag 4 replies to the inductor during the first time slot, the RFID tags 1 and 2 reply to the inductor during the second time slot, and the RFID tags 3 and 5 reply to the inductor during the third time slot. In this stage of time slots, the inductor can only successfully identify the RFID tag 4 that replies during the first time slot, while other RFID tags are similarly identified through their UID codes during the time slots of the next stage until all RFID tags are identified by the inductor.

Generally speaking, the architecture implementing time slots to detect apparatuses is entirely realized by hardware. FIG. 1 shows a block diagram of hardware of a conventional time slot detecting system 10. The conventional time slot detecting system 10 comprises a timer 12, a time slot controller 14 and a communication protocol processor 16. When the conventional time slot detecting system 10 begins to perform a time slot detection, the time slot controller 14 defines a length of a time slot period on the timer 12 via a universal input/output bus 18. When timing each time slot, the timer 12 sends a time slot start signal (e.g., a time slot interrupt signal INT_S) or uses a poll approach to inform the time slot controller 14. Upon sending the time slot interrupt signal INT_S, the timer 12 starts timing a period. At this point, the time slot controller 14 triggers the communication protocol processor 16 with an enable signal S_EN, such that the communication protocol processor 16 begins to process operations associated with an RFID communication protocol. When the operations associated with the RFID communication protocol are processed, the communication protocol processor 16 replies to the time slot controller 14 with a completion signal SC, and thus the time slot controller 14 deactivates the communication protocol processor 16 with a disable signal S_ENB.

However, the time slot detecting system 10 realized by hardware has a disadvantage of lacking design flexibility. Since circuits inside the communication protocol processor 16 and the time slot controller 14 are designed in compliance with a certain RFID communication protocol, when the RFID communication protocol or some detailed specification of the RFID communication protocol needs to be changed, corresponding hardware circuits need to be redesigned to again comply with the changed RFID communication protocol, resulting in inconvenience of design adjustment.

SUMMARY OF THE DISCLOSURE

According to an embodiment of the present disclosure, a method for performing data access according to communication protocol handling is provided. The method comprises calculating a time slot period and an upper limit of a processing time for performing predetermined data processing according to time slot information defined in a communication protocol, a critical period and a time slot number; defining a clock frequency of a processor according to the processing time; and performing data access according to the time slot period by the processor operating at the clock frequency.

According to another embodiment of the present disclosure, an apparatus for performing data access according to communication protocol handling is provided. The apparatus comprises a time slot timing generator and a processor. The time slot timing generator calculates a time slot period and an upper limit of a processing time for performing predetermined data processing according to time slot information defined in a communication protocol, a critical period and a time slot number. The processor performs data access according to the time slot period, and a clock frequency of the processor is defined according to the upper limit of the processing time.

According to yet another embodiment of the present disclosure, a method for performing data access according to a communication protocol is provided. The method comprises finding a first time length of a first time slot according to the communication protocol; defining a critical period and a time slot number; generating a second time slot according to the first time slot, the critical period and the a time slot number; defining a clock signal according to the second time slot; and performing data access according to the time clock.

A method and an apparatus provided by the present disclosure not only solve the problem of lacking design flexibility, but also prevents a non-real-time problem incurred by using software.

DETAILED DESCRIPTION OF THE PREFERRED EMBODIMENT

Figure 1:
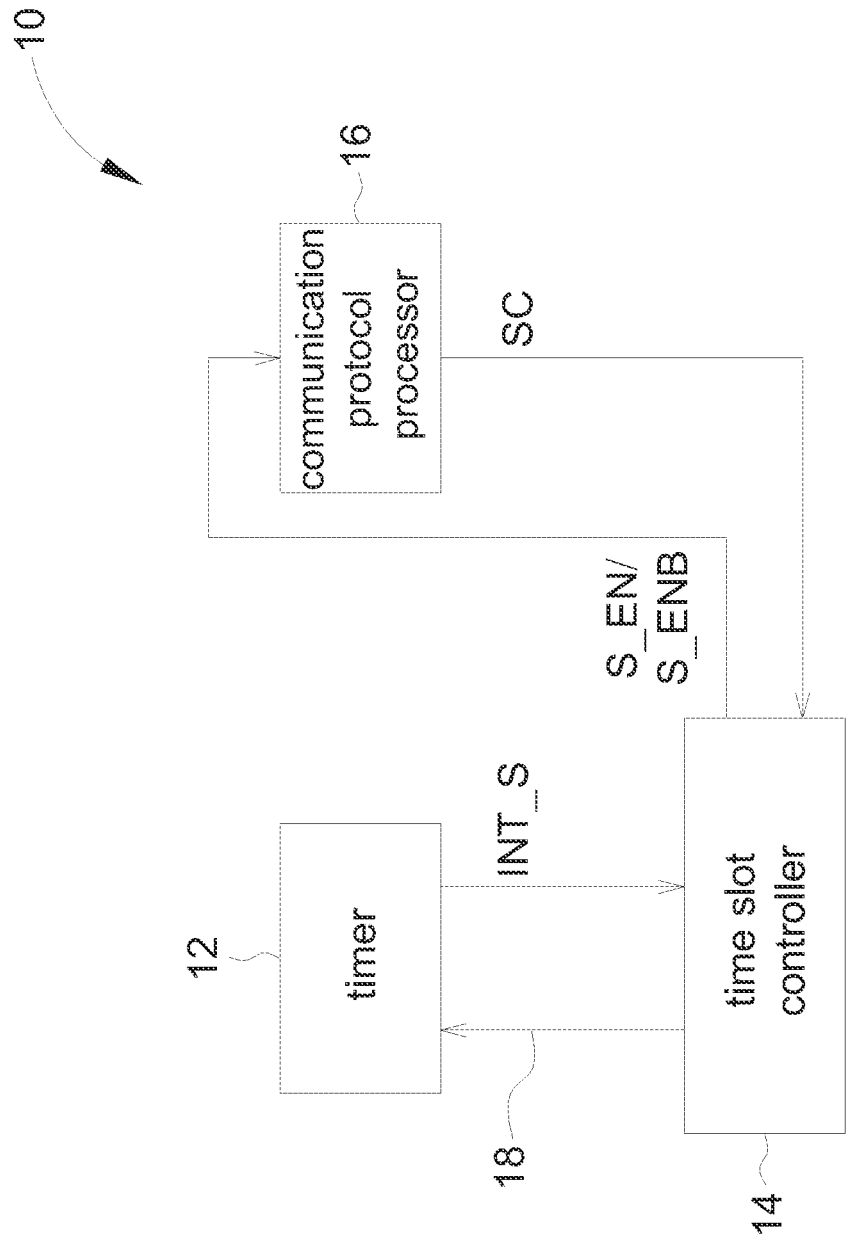
FIG. 1 is a block diagram of a conventional time slot detecting system.

In view of the foregoing description, a software solution is provided by the present disclosure to overcome the disadvantage of inconvenience in design adjustment resulted from a time slot detecting system realized by hardware in the prior art. That is, in one embodiment of the present disclosure, the part performed by the communication protocol processor 16 and the time slot controller 14 in FIG. 1 is executed by software. A new time slot period (Tsn) and an upper limit of a processing time (Tp) are calculated, a clock frequency of a processor is defined, and data access is performed according to the time slot period by the processor operating at the clock frequency to ensure that a non-real-time problem resulted from software is not incurred.

Figure 2:
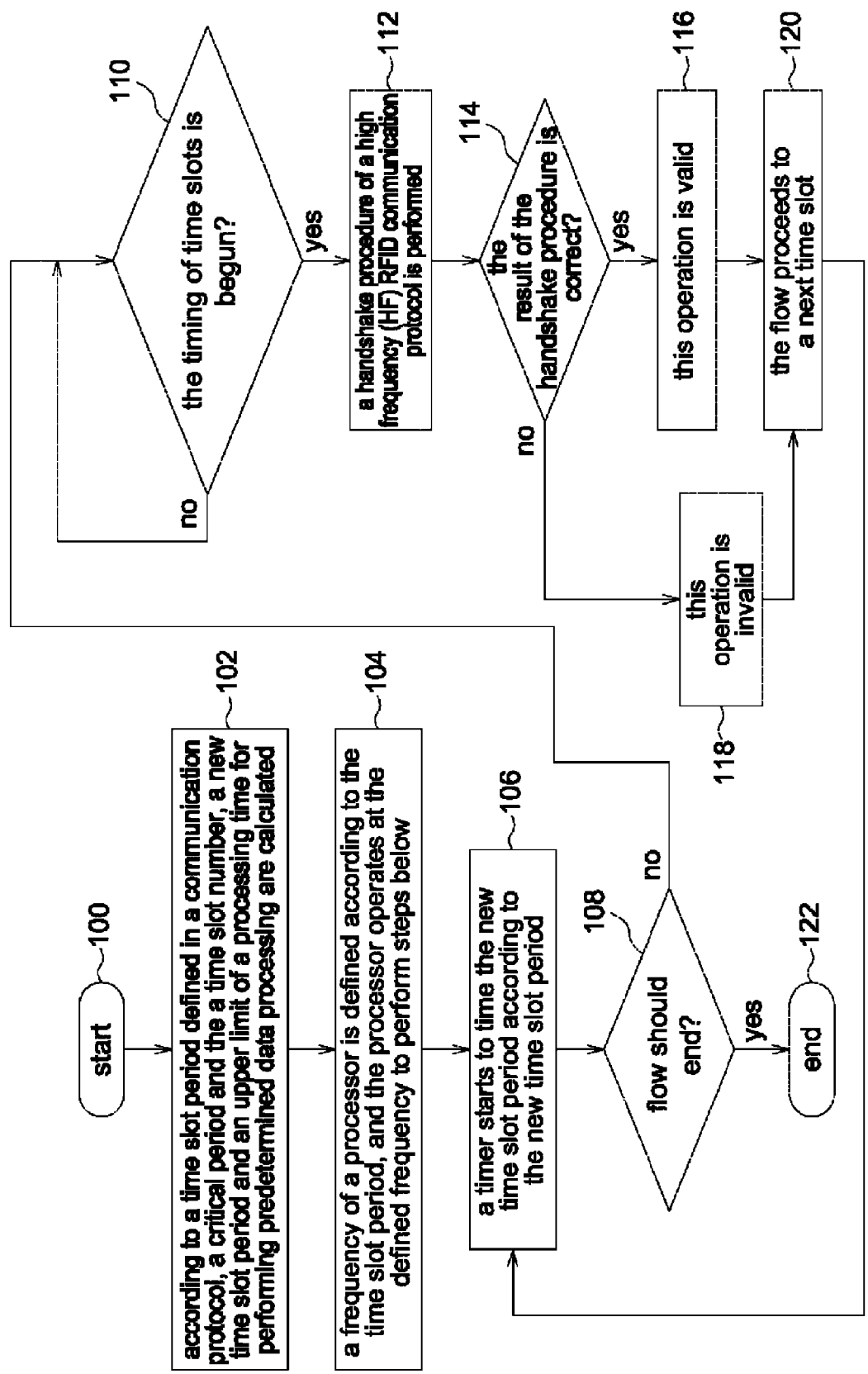
FIG. 2 is a flow chart of a method for performing data access according to communication protocol handling in accordance with an embodiment of the present disclosure.

FIG. 2 shows a flow chart of a method for performing data access according to communication protocol handling in accordance with an embodiment of the present disclosure. The method for performing data access according to communication protocol handling comprises steps below.

The method begins with Step 100. At Step 102, according to a time slot period Ts defined in a communication protocol, a critical period Tc and the a time slot number Ns, a new time slot period Tsn and an upper limit of a processing time Tp for performing predetermined data processing are calculated. At Step 104, a frequency of a processor is defined according to the time slot period Tsn, and the processor operates at the defined frequency to perform steps below. At Step 106, a timer starts to time the new time slot period Tsn according to the new time slot period. At Step 108, it is determined whether the flow should end, i.e., it is determined whether all time slots are counted. When the answer of Step 108 is negative, Step 110 is performed; otherwise, Step 122 is performed. At Step 110, it is determined whether the timing of time slots is begun according to the time slot interrupt signal from the timer. When the answer of Step 110 is positive, Step 112 is performed; otherwise, Step 110 is performed. At Step 112, a handshake procedure of a high frequency (HF) RFID communication protocol is performed. At Step 114, it is determined whether the result of the handshake procedure is correct. When the answer of Step 114 is positive, Step 116 is performed; otherwise, Step 118 is performed. At Step 116, it is determined that this operation is valid, and Step 120 is performed. At Step 118, it is determined that this operation is invalid, and Step 120 is performed. At Step 120, the flow proceeds to a next time slot, and returns to Step 106. The flow ends with Step 122.

At Step 102, a new time slot period Tsn is calculated according to a time slot period Ts defined in a communication protocol, a critical period and a time slot number Ns, and the time slot period Ts defined in the communication protocol is a time slot period for completely performing the foregoing hardware processing. Since the hardware operates at a high frequency, a problem that the data access cannot be performed within a certain period is not incurred, i.e., the data access can be completed by entirely using hardware during the time slot period defined in the communication protocol, and the new time slot period Tsn need not be calculated. However, in the method provided by the present disclosure, the time slot detecting flow is completed by software, and accordingly the new time slot period Tsn is needed to make sure that the data access is completed in time. The critical period Tc is a short period at the beginning of the time slot period. During the critical period Tc, RFID tags have to reply to an RFID reader with a signal. When no signal is replied by the RFID tags to the RFID reader during the critical period Tc, it means that no signal reply exists during a time slot of the critical period Tc, i.e., the time slot is an empty time slot. The time slot number Ns is the number of time slots which are temporally consecutive. An approach of calculating the new time slot period Tsn and the upper limit of a processing time Tp for data processing is described in detail in the following paragraphs.

At Step 104, when the new time slot period Tsn is obtained, the frequency of the processor is defined according to the new time slot period Tsn, such that the processor performs subsequent steps by operating at the defined frequency. That is, when the new time slot period Tsn is expired and data of the processor is however not yet processed, it means that the processor is too slow to achieve an immediacy requirement of data processing. Therefore, a higher clock frequency needs to be redesigned or another proper processor is selected. At Step 106, the processor controls the timer to time the new time slot period Tsn according to the new time slot period Tsn. As mentioned above, at the beginning of timing each of the time slots, the timer transmits a time slot start signal such as a time slot interrupt signal to the processor, or uses a poll approach to inform the processor. At Step 108, when the timer begins to time, the processor first determines whether the flow should end. When Step 108 is not a final step, i.e., the time slots are not completely counted, the flow proceeds to the next step (i.e., Step 110); otherwise, Step 122 is performed. At Step 122, the flow ends. At Step 110, when it is determined that the flow should not end, the processor determines whether the timing of time slots is begun according to the time slot interrupt signal transmitted from the timer. When the time slot interrupt signal transmitted from the timer is received, meaning that the timing of time slots is begun, the flow proceeds to Step 112; otherwise, when the time slot interrupt signal transmitted from the timer is not yet received, the flow remains at Step 110 and proceeds to Step 112 until the time slot interrupt signal is received.

At Step 112, the handshake procedure of the HF RFID communication protocol is performed. The handshake procedure is for determining whether any RFID tag replies to the RFID reader with signals during the critical period Tc. When the answer is positive, it is further determined whether data transmitted by the RFID tag replying to the RFID reader is accurately received, i.e., at Step 114, it is determined whether a preamble code of the data of the RFID tag is correct, and whether a collision occurs. When no RFID tag replies to the RFID reader, the data replied by the RFID tag is incorrect or the collision occurs, Step 118 is performed; otherwise, when only one single RFID tag replies to the RFID reader (i.e., no collision occurs) and the replied data is correct, Step 116 is performed. At Step 118, it is determined that this operation is invalid. At Step 116, it is determined that this operation is valid. When the RFID reader determines that this operation is valid at Step 116, Step 120 is performed. At Step 120, the RFID reader stores the data received during the time slot into a storage device (e.g., a memory), and prepares to proceed to a next time slot, i.e., the RFID reader prepares to receive another data during the next time slot. When the RFID reader determines that this operation is invalid at Step 118, Step 120 is performed. At Step 120, the RFID reader stores an error code into the foregoing storage device, and similarly proceeds to the next time slot to receive another data during the next time slot. The step of preparing to receive another data during the next time slot is to check whether the timer finishes timing the new time slot period Tsn. When the new time slot period Tsn is expired, the flow returns to Step 106 to reset the timer to time the next time slot according to the new time slot period Tsn. When the new time slot period Tsn is not expired, the flow returns to Step 106 after the timer finishes timing the time slot period Tsn to start timing the next time slot. As mentioned above, after the preamble code of the data is checked, it is further determined whether the data is correct by implementing, e.g., a cyclic redundancy check (CRC) or a checksum check; however, as a result of insufficient the processing time, the check of the data is always postponed and only performed after all the time slot ends.

Note that on a premise that the same effect is achieved in practice, the steps of generating the flow need not be executed as the sequence shown in FIG. 2, and can be interleaved with other steps of the same flow.

Figure 3:
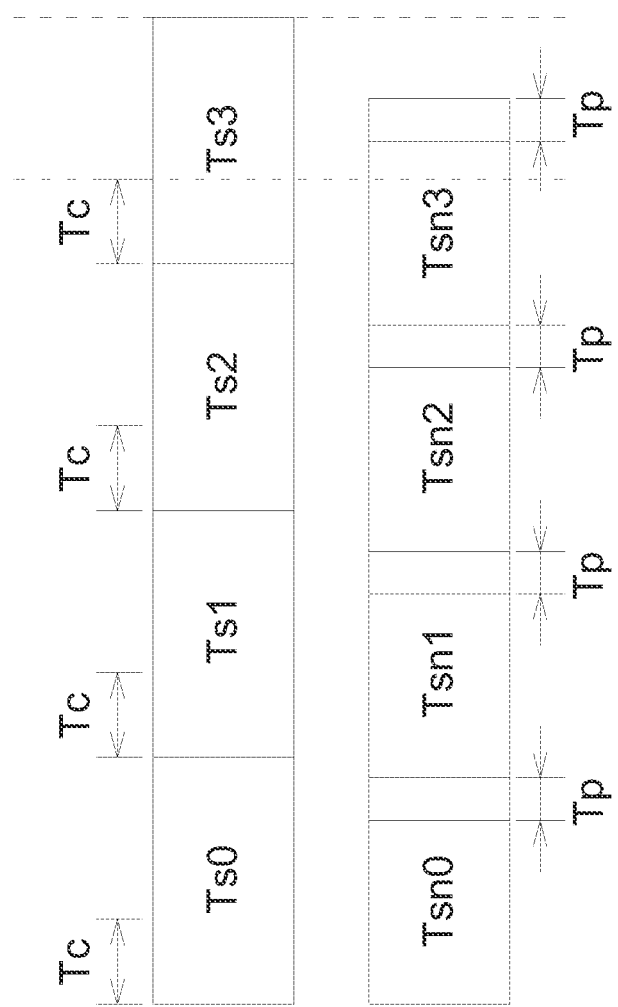
FIG. 3 is a schematic diagram of a comparison between a new time slot period and an old time slot period when the new time slot period is shorter.
Figure 4:
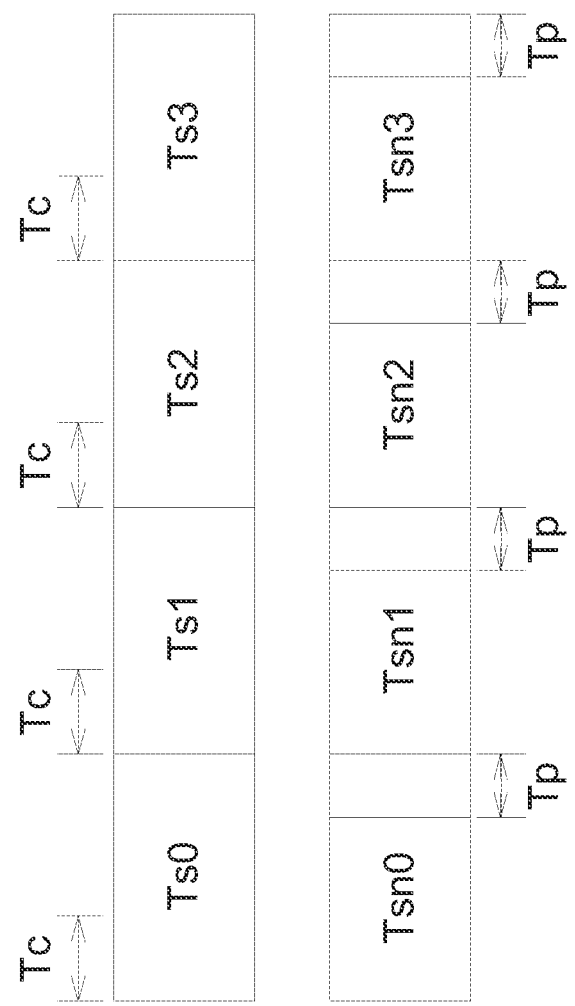
FIG. 4 is a schematic diagram of a comparison between a new time slot period and an old time slot period when the new time slot period is longer.

FIG. 3 shows an approach for calculating a new time slot period Tsn and a processing time Tp for performing predetermined data processing, with 4 time slots in FIG. 3 and FIG. 4 being illustrated for example. The processing time Tp is shorter since a processor in FIG. 3 has a more powerful calculation capability, and the processing time Tp is longer since the processor in FIG. 4 has a weaker calculation capability. The top parts of FIG. 3 and FIG. 4 respectively show the old time slot period Ts (i.e., a time slot period previously defined in a communication protocol) including Ts0, Ts1, Ts2 and Ts3, each of which being marked with a critical period Tc at the beginning thereof. The bottom parts of FIG. 3 and FIG. 4 respectively show the new time slot period Tsn including Tsn0, Tsn1, Tsn2 and Tsn3, each of which being appended with a processing time Tp at the end thereof. During the critical period Tc, RFID tags have to reply to an RFID reader, and thus any time slot from either the old time slot period Ts or the new time slot period Tsn can cover the critical period Tc to determine whether any RFID tag replies to the RFID reader during the time slot. Steps performed during the processing time Tp at least comprises determining whether this operation is valid or invalid, and preparing to proceed to a next time slot. Taking the time slot Tsn1 from the new time slot period in FIG. 3 as an example, when the time slot Tsn1 from the new time slot period is an empty time slot (i.e., no RFID tag replies to the RFID reader), the flow does not comprises too many steps after the critical period Tc, such that the processing time Tp is rapidly entered and ended to enter the next time slot Tsn2. However, in another aspect, the time slot Tsn2 from the new time slot period Tsn cannot be too short in order to ensure that the time slot Tsn2 from the new time slot period Tsn covers the critical period Tc of the time slot Ts2 from the old time slot period Ts. Likewise, taking the time slot Tsn1 from the new time slot period Tsn in FIG. 4 as an example, when RFID tags reply to the RFID reader during the time slot Tsn1 from the new time slot period Tsn, the flow comprises a data check procedure after the critical period Tc, such that the processing time Tp cannot be immediately entered or ended to enter the next time slot Tsn2. However, in another aspect, the time slot Tsn2 from the new time slot period Tsn and the processing time Tp cannot be too long in order to ensure that the time slot Tsn2 from the new time slot period Tsn covers the critical period Tc of the time slot Ts2 from the old time slot period Tsn. In conclusion, the time slot Tsn2 from the new time slot period Tsn and an upper limit of the processing time Tp are respectively calculated as:

$$Tp \leq (Ts-Tc)/Ns; \text{ and} \qquad \text{(Formula 1)}$$

$$Tsn = Ts - (Ts-Tc)/Ns \qquad \text{(Formula 2)}$$

where Ns is a maximum time slot number defined in a communication protocol.

Since Formula 1 and Formula 2 are calculated on the base of a maximum value of the time slot number, the upper limit of the obtained processing time Tp has a minimum value. Accordingly, the obtained processing time Tp smaller than the minimum value of the upper limit of the processing time Tp satisfies the formulas based on other smaller time slot numbers Ns. When a processor has a constant frequency that cannot be adjusted, the upper limit of the processing time Tp of the processor is adjusted, and steps performed during the processing time Tp are redefined. The redefined steps at least comprise determining whether this operation is valid or invalid, and preparing to proceed to a next time slot, and other remaining steps are performed after the whole time slot ends.

Taking a near field communication protocol (e.g., NFC 212/424/848 protocols) for handling a signal device detection as an example, suppose that the time slot period time Ts is defined in the communication protocol, the critical period Tc is 720 µs, and the time slot number is 16. The new time slot period is calculated as:

$$Ts = 256*64/fc(13.56 \text{ MHz}) = 1208.2596 \text{ µs}$$

$$Tc = 720 \text{ µs};$$

$$Ns = 16;$$

$$Tp \leq (Ts-Tc)/Ns;$$

$$Tp \leq 30.516225 \text{ µs};$$

$$Tsn = Ts - (Ts-Tc)/Ns; \text{ and}$$

$$Tsn = 1177.743375 \text{ µs}$$

Figure 5:
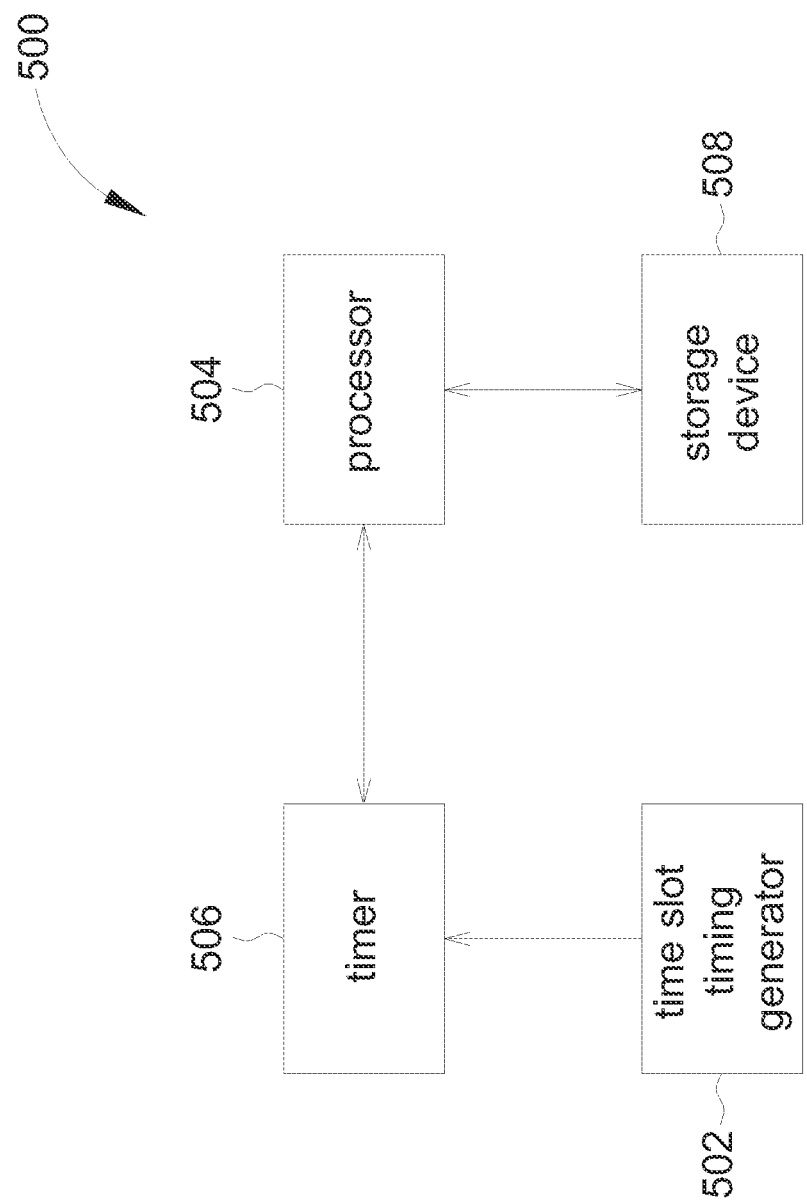
FIG. 5 is a functional block diagram of an apparatus for performing data access according to communication protocol handling in accordance with an embodiment of the present disclosure.

FIG. 5 shows a functional block diagram of an apparatus 500 for performing data access according to communication protocol handling in accordance with an embodiment of the present disclosure. The apparatus 500 comprises but not limited to a time slot timing generator 502, a processor 504, a timer 506 and a storage device 508. The time slot timing generator 502 calculates a new time slot period Tsn and a processing time Tp for performing predetermined data processing according to time slot information Ts defined in a communication protocol, a critical period Tc and a time slot number. The processor 504 performs data access according to the new time slot period Tsn, and a clock frequency of the processor 504 is defined according to an upper limit of the processing time Tp and a number of commands. In addition, the timer 506 times according to the new time slot period Tsn, and generates a time slot start signal (e.g., a time slot interrupt signal INT_S). The storage device 508 stores a determination result generated by the processor 504. The processor 504 receives the time slot interrupt signal INT_S transmitted from the timer 506, determines data during a time slot to generate the determination result, and determines whether the new time slot period Tsn timed by the timer is expired. In this embodiment, the functions performed by the communication protocol processor 16 and the time slot controller 14 in FIG. 1 are realized by the processor 504 via software, and the timer is realized via hardware. Since an operation of the apparatus 500 illustrated in FIG. 5 follows the flow in FIG. 2, and the technology of the method for performing data access according to communication protocol handling is described in detail in the foregoing description, a person having ordinary skill in the art can easily understand functions and operations of components of the apparatus 500 illustrated in FIG. 5 with reference to the foregoing description—the detailed description of the apparatus 500 shall not be further described for brevity.

In conclusion, according to the present disclosure, according to communication protocol handling, a part previously processed by a communication protocol processor and a time slot controller in a hardware system for detecting an apparatus by using time slots is switched to be processed by software, so as to increase flexibility in possible design modifications. Further, a new time slot period Tsn and an upper limit of a processing time Tp for performing data processing are calculated, and a proper frequency of a processor is selected to ensure immediacy of data processing. Accordingly, on top of providing efficiency and convenience, the foregoing problems of lacking design flexibility as well as being non-real-time are avoided by using software according to the present disclosure.

While the present disclosure has been described in terms of what is presently considered to be the most practical and preferred embodiments, it is to be understood that the inventive concept need not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A method for performing data access according to communication protocol handling, the method comprising:
   calculating a new time slot period and an upper limit of a processing time for performing predetermined data processing based on an old time slot period defined in a communication protocol, a critical period and a time slot number;
   defining a clock frequency according to the upper limit of the processing time; and
   performing the data access by a processor operating at the clock frequency according to the new time slot period which is different from the old time slot period,
wherein the critical period is shorter than a first time length of the old time slot, and wherein the critical period is for receiving a data signal.

2. The method as claimed in claim 1, wherein the step of performing the data access by the processor operating at the clock frequency according to the new time slot period comprises:
   implementing the processor operating at the clock frequency to:
      start a timer to begin timing the new time slot period;
      determine whether a start signal of a time slot is received from the timer;
      determine data of the time slot and generate a determination result when the start signal of the time slot is received;
      store the determination result; and
      determine whether the new time slot period timed by the timer is expired.

3. The method as claimed in claim 2, wherein the start signal, of the time slot, received from the timer, is an interrupt signal.

4. The method as claimed in claim 2, wherein the start signal, of the time slot, received from the timer, is a poll signal.

5. The method as claimed in claim 2, wherein the step of determining whether the new time slot period timed by the timer is expired is performed after the step of storing the determination result.

6. The method as claimed in claim 2, further comprises:
   when the new time slot period is not expired, implementing the processor operating at the clock frequency to perform data access of a next time slot period until the new time slot period is expired.

7. The method as claimed in claim 2, wherein the step of determining whether the new time slot period timed by the timer is expired comprises:
   when the new time slot period is expired, performing data access of a next time slot.

8. The method as claimed in claim 1, wherein the new time slot period is determined according to the old time slot period defined in the communication protocol, the critical period, and the time slot number.

9. The method as claimed in claim 1, wherein the upper limit of the processing time for performing the predetermined data processing is determined according to a time slot period defined in the communication protocol, the critical period, and the time slot number.

10. The method as claimed in claim 1, wherein the communication protocol handling is near field communication (NFC) protocol handling.

11. The method as claimed in claim 1, wherein calculating a new time slot period and an upper limit of a processing time comprises using the old time slot period, the critical period and the time slot number as parameters in calculating the new time slot period and the upper limit of the processing time.

12. The method as claimed in claim 11, wherein the new time slot period and the upper limit of the processing time are respectively calculated as follows:

$$T_{sn} = T_s - (T_s - T_c)/N_s; \text{ and}$$

$$T_p \leq (T_s - T_c)/N_s,$$

wherein $T_{sn}$ represents the new time slot period, $T_s$ represents the old time slot period, $N_s$ represents the time slot number, and $T_p$ represents the upper limit of the processing time.

13. A method for performing data accessing according to a communication protocol, the method comprising:
   determining a first time length of a first time slot according to the communication protocol, the first time slot being an old time slot;
   defining a critical period and a time slot number of the first time slot;
   generating a second time slot of a second time length based on the first time length, the critical period and the time slot number, the second time slot being a new time slot and different from the first time slot;
   defining a clock signal according to the second time slot; and performing the data access by a processor according to the clock signal and the second time slot,
wherein the critical period is shorter than the first time length, and wherein the critical period is for receiving a data signal.

14. The method as claimed in claim 13, wherein the step of performing the data access according to the clock signal comprises:
determining a start time of the second time slot according to the clock signal;
receiving a data signal; and
performing a handshake procedure of the communication protocol.

15. The method as claimed in claim 14, further comprising: checking whether the data signal is accurately received.

16. The method as claimed in claim 15, where the step of checking whether the data signal is accurately received comprises:
checking whether a collision of the data signal occurs; or
checking whether a preamble code of the data signal is correct.

17. The method as claimed in claim 15, further comprising: preparing to receive another data signal during a next time slot.

18. The method as claimed in claim 17, further comprising:
determining an operating clock of a microprocessor according to a result of the checking whether the data signal is accurately received, the preparing to receive the another data signal during the next time slot, the first time length, and the second time length; and
wherein, at the operating clock, the microprocessor is capable of completing checking whether the data signal is accurately received and preparing to receive the another data signal during the next time slot during a time interval between the first time length and the second time length.

19. The method as claimed in claim 13, wherein the second time slot comprises a second time length that is shorter than the first time length.

20. The method as claimed in claim 13, wherein the communication protocol is a radio frequency identification (RFID) communication protocol, wherein an RFID reader accesses data of a plurality of RFID tags according to the RFID communication protocol, wherein the plurality of RFID tags respectively comprise temporally successive first time slots, and wherein each of the RFID tags replies to the RFID reader with a data signal during the corresponding first time slot.

* * * * *